United States Patent [19]

Itoh

[11] Patent Number: 4,607,878
[45] Date of Patent: Aug. 26, 1986

[54] BODY STRUCTURE FOR AUTOMOBILES
[75] Inventor: Takanobu Itoh, Saitama, Japan
[73] Assignee: Honda Giken Kogyo Kabushiki Kaisha, Tokyo, Japan
[21] Appl. No.: 620,495
[22] Filed: Jun. 14, 1984
[30] Foreign Application Priority Data Jun. 17, 1983 [JP] Japan ............................ 58-109073
Jun. 17, 1983 [JP] Japan ............................ 58-109074
Jun. 20, 1983 [JP] Japan ............................ 58-110692

[51] Int. Cl.⁴ ............................................. B62D 25/00
[52] U.S. Cl. ................................. 296/199; 296/209; 296/31 P; 280/153 B
[58] Field of Search ............... 293/128; 296/209, 199, 296/198, 31 P; 280/153 B

[56] References Cited
U.S. PATENT DOCUMENTS 4,153,290 5/1979 Barenyi ........................ 296/31 P
4,412,698 11/1983 Kingsley ....................... 296/97 A
4,493,506 1/1985 Alexander ..................... 296/128

FOREIGN PATENT DOCUMENTS 1906874 9/1970 Fed. Rep. of Germany ... 280/153 B

Primary Examiner—Robert R. Song
Attorney, Agent, or Firm—Lyon & Lyon

[57] ABSTRACT

A synthetic resin body panel for mounting on a skeletal automobile body to cover the entire door sill and the front lower portion of the rear fender with the front edge offset inwardly to be clamped between the front fender and auto body to allow movement for thermal expansion and contraction. A sealing member is clamped between the rearmost portion of the panel and the skeletal body of the rear fender for preventing water, pebbles, etc. from entering the space between the panel and body.

10 Claims, 8 Drawing Figures

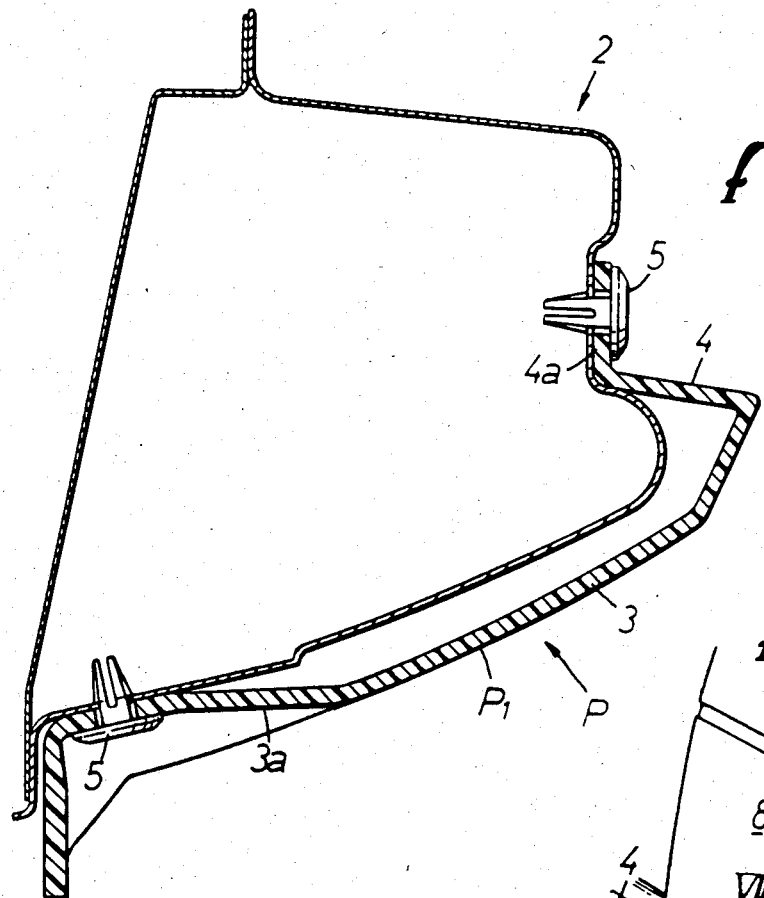
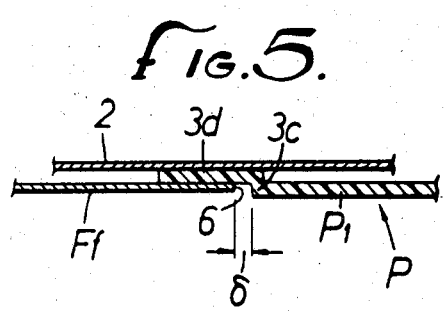
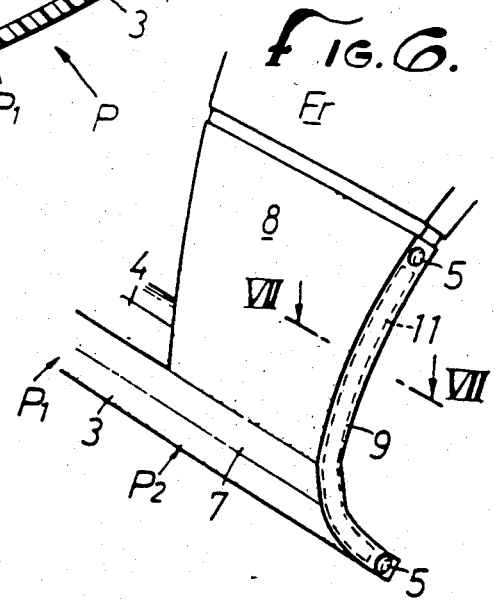
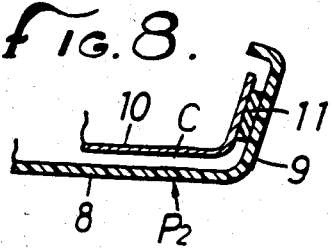

BODY STRUCTURE FOR AUTOMOBILES

The present invention relates to a body of an automobile and, in particular, to a synthetic resin panel for the lower side portion of the automobile body and the means for joining same to the body.

The development of a synthetic resin material having excellent properties such as toughness and shock resistance has provided a means for reducing the weight of an automotive body, preventing corrosion, reducing the production cost and improving the appearance by making portions of exposed body of the automobile of a panel of the synthetic resin in place of a metal plate, such as steel plate.

For example, in a passenger car that portion of a body panel which rims the lower portion of a door opening is subject to being damaged by accidental contact from the shoes or luggage of a passenger when the passenger frequently gets in and out of the car and by the impact of pebbles, mud, water, etc. while the car is running. Moreover, rain or the water and mud splashed from the road may cause corrosion of such a body panel made of sheet metal, corrosion that can be avoided by using synthetic resins. However, since the metal auto body and synthetic resin panels are different materials there are various problems concerning mounting, sealing and accommodating different rates of thermal expansion between the two members which must be solved. While prior U.S. Pat. Nos. 3,596,979 and 4,196,929 suggest some structures of this type, those structures do not solve all of these problems.

The present invention has an object to provide an automotive body structure having its metal skeletal body covered with a lower cover plate of synthetic resin comprising a front portion covering a side sill just below a door opening of said skeletal body and a rear portion forming the front lower portion of the rear fender of said skeletal body and is jointed to said skeletal body, whereby it resists damage and corrosion and can be simply replaced when damaged.

Another object of this invention is to provide a synthetic resin body panel for an automotive body wherein one end of the panel is adapted to be clamped between members of the automotive body in a manner to allow relative movement for accommodating different rates of thermal expansion.

A further object of this invention is to provide a mounting system for a synthetic resin body panel on a sheet metal skeletal body to inhibit the intrusion of water, mud, pebbles, etc. from therebetween that otherwise would damage the metal.

Other and more detailed objects and advantages of this invention will appear from the following detailed description and the accompanying drawings, wherein:

FIG. 4 is a longitudinal section taken along line IV—IV of FIG. 3.

FIG. 5 is a transverse section taken along line V—V of FIG. 3.

FIG. 6 is an enlarged perspective view showing the portion B of FIG. 2 and taken from the rear.

FIG. 7 is a section taken along line VII—VII of FIG. 6.

FIG. 8 is a transverse section similar to FIG. 7 but shows a modification of the present invention.

Figure 1:
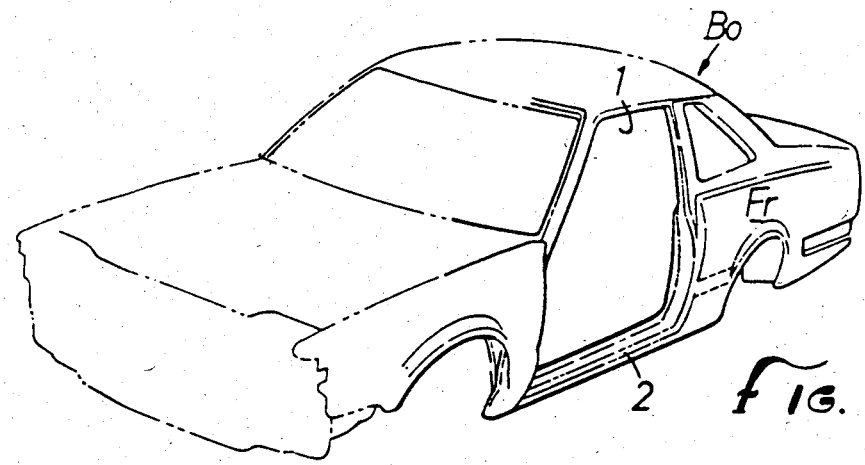
FIG. 1 is a perspective view of a monocoque type skeletal automobile body to which this invention is applicable.
Figure 2:
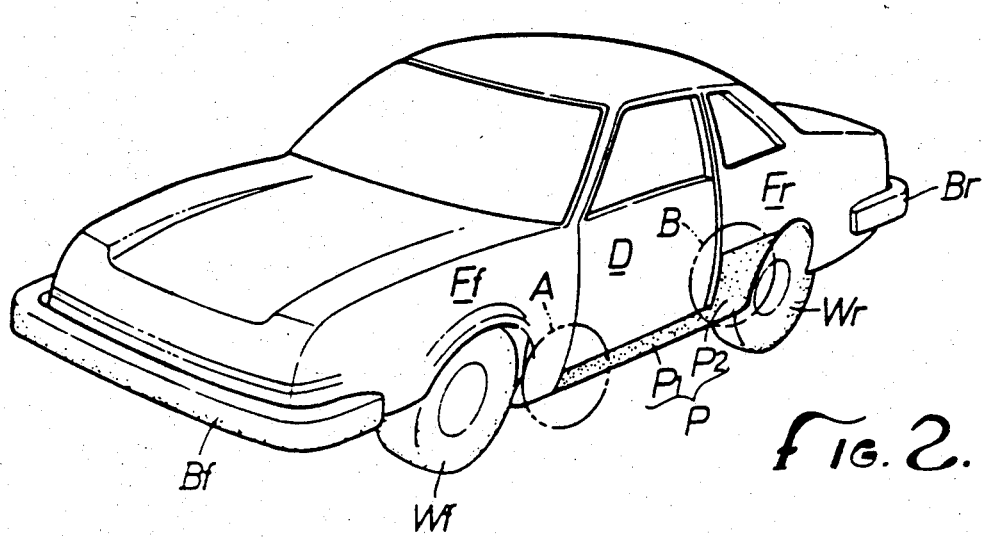
FIG. 2 is a perspective view of the finished automobile body incorporating the body structure of this invention.

Referring now to FIG. 1 which shows a monocoque skeletal body Bo and FIG. 2 which shows a finished car, a lower cover panel or plate P composed of front and rear cover plate portions $P_1$ and $P_2$ is made of a synthetic resin or any other appropriate synthetic material (all herein referred to as "synthetic resin") and is mounted on the skeletal body Bo. The skeletal body Bo is equipped with the usual front and rear wheels Wf and Wr, a door D, front and rear bumpers Bf and Br, and a front fender Ff.

The skeletal body Bo is covered, at the portion just below the door opening 1 for a passenger to get in and out, with the front cover plate portion $P_1$, and at the side of the front lower portion of a rear wheel housing with the rear cover plate portion $P_2$ which thereby forms the front lower portion of the rear fender Fr. Thus, the aforementioned front and rear cover plate portions $P_1$ and $P_2$ are integrally molded of the synthetic resin plate to constitute the lower cover plate P.

Figure 3:
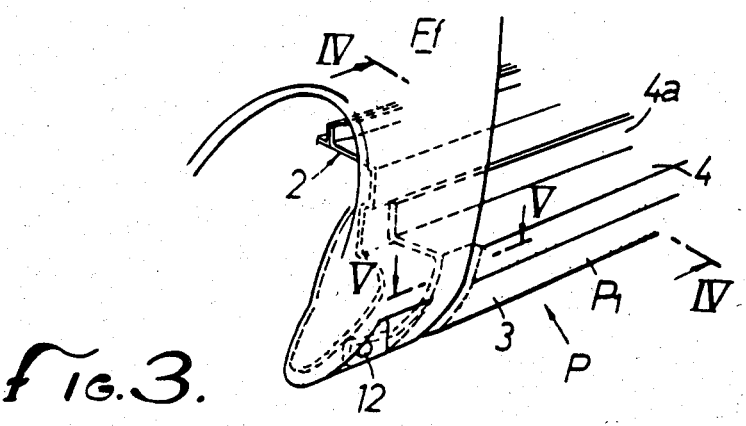
FIG. 3 is an enlarged perspective view showing the portion A of FIG. 2 and taken from the front with the door being removed.

As shown in FIGS. 3 and 4, the front cover plate portion $P_1$ is formed with an outwardly rising and sloped side face 3 and a generally horizontal upper face 4, which extend along the lower half of a side sill 2 of the skeletal body Bo and runs longitudinally below the door opening 1. The aforementioned sloped side face 3 is formed at its lower portion with a plurality of mounting recesses $3a$ which are spaced in the longitudinal direction. The aforementioned upper face 4 is formed at its end edge integrally with a mounting flange $4a$ which stands upright. As shown in FIG. 4, the aforementioned mounting recesses $3a$ and mounting flange $4a$ are removably jointed to the bottom and side faces of the side sill 2, respectively, by means of clips 5 made of a synthetic resin.

As shown in FIG. 5, the sloped side face 3 of the front cover plate portion $P_1$ is formed at its front end with a stepped portion $3c$ and a clamped portion $3d$ which is slightly recessed inward. This clamped portion $3d$ is fitted between and clamped by the outer face of the aforementioned side sill 2 and the front fender Ff which is fixed to the outer side of the skeletal body Bo by means of bolts 12. Between the rear end edge 6 of the front fender Ff and the stepped portion $3c$ of the front cover plate portion $P_1$, there is formed a small gap δ for allowing the lower cover plate P of the synthetic resin to expand and contract in the longitudinal direction. Moreover, the outer face of the front fender Ff is made generally coextensive with the outer face of the front cover plate portion $P_1$.

As shown in FIGS. 6 and 7, the aforementioned rear cover plate portion $P_2$ is formed with a sloped side face 7, which forms an extension of the sloped side face 3 of the aforementioned front cover plate portion $P_1$, and an upper portion 8, which extends upwardly from the sloped side face 7. The rear edge of portion $P_2$, has an end edge 9 bent inward generally at a right angle. Moreover, the rear cover plate portion $P_2$ forms a portion, i.e., the front lower portion, of the rear fender Fr. The rear cover plate portion $P_2$ covers the outer face of the body panel 10 of the skeletal body Bo while leaving a gap C inbetween, and a seal member 11 made of an elastic material is sandwiched between portion $P_2$ and panel 10, preferably along the edge 9. The seal member 11 prevents water, mud, pebbles or the like from entering into the gap C. The rear end edge 9 of the rear cover plate portion P₂ is fixed at its upper and lower portions to the body panel 10 of the skeletal body Bo by means of the synthetic resin clips 5.

It is to be noted, that the upper edge of the aforementioned rear cover plate P₂ is at a lower level than the upper face of the rear bumper Br.

FIG. 8 shows a modification of the rear cover plate portion P₂ of the lower cover plate. In this modification, the rear end edge 9 of the rear cover plate P₂ is bent into a channel shape in a transverse section which provides added strength and damage protection.

As is apparent from the embodiment described, according to the present invention, the front cover plate portion covering the side sill just below the door opening of the skeletal body and the rear cover plate portion forming the front lower portion of the rear fender of said skeletal body are integrally molded of the synthetic resin plate to construct the lower cover plate, which is jointed to the aforementioned skeletal body. As a result, the aforementioned lower cover plate resists damage by the impact of pebbles while the car is running and by contact of shoes or luggage of the passenger getting in and out, and is excellent in water repellency and corrosion resistance to the attack of water such as rain droplets so that the cover plate covering the portion below the door opening, which might otherwise be liable to be damaged, will remain structural sound and beautiful for a long time.

Moreover, the aforementioned lower cover plate can be simply and inexpensively replaced by a new one when it is damaged.

Since the aforementioned lower cover plate has its front and rear portions molded integrally of each other, the number of required mounted portions on the skeletal body can be reduced so that the number of the assembling steps also can be reduced.

What is claimed:

1. An automobile body structure for a skeletal body having a front fender portion, a door sill portion and a rear fender portion, the improvement comprising an integral synthetic resin panel having a front portion covering the door sill portion and a rear portion covering the front lower portion of the rear fender portion of the skeletal body and wherein means are provided for mounting said panel on said skeletal body in a manner for allowing longitudinal expansion and contraction of said panel relative to said skeletal body and wherein said mounting means include an inwardly offset portion on the forwardmost edge of said panel which is slidably clamped between said front fender portion of the skeletal body and the front fender.

2. The structure of claim 1 wherein said mounting means include synthetic clips connecting the rearmost edge of said panel to said rear fender portion of the skeletal body.

3. The structure of claim 1 wherein a longitudinal gap is provided between said panel offset portion and the rearmost edge of the front fender.

4. The structure of claim 1 wherein sealing means are provided between the skeletal body and at least one edge of said panel.

5. The structure of claim 1 wherein the rearmost edge portion of said panel is turned inwardly to form a portion of the rear fender wheel opening.

6. The structure of claim 5 wherein sealing means are provided between said inwardly turned portion of said panel and said rear fender portion of the skeletal body.

7. The structure of claim 5 wherein said inwardly turned portion is channel shaped.

8. The structure of claim 5 wherein fastening means are provided and mount said inwardly turned portion to said rear fender portion of the skeletal body.

9. An automobile body structure for a skeletal body having a front fender portion, a door sill portion and a rear fender portion, the improvement comprising an integral synthetic resin panel having a front portion covering the door sill portion and a rear portion covering the front lower portion of the rear fender portion of the skeletal body wherein the rearmost edge portion of said panel is turned inwardly to form a portion of the rear fender wheel opening and wherein the forwardmost edge of said panel is provided with an inwardly offset portion for slidably clamping between said front fender portion of the skeletal body and the rearmost edge of the front fender.

10. An automobile body structure for a skeletal body having a front fender portion, a door sill portion and a rear fender portion, comprising, a unitary synthetic resin panel having a front portion covering the door sill portion of the skeletal body and an integral rear portion covering the front lower area of the rear fender portion of the skeletal body, said panel having a forwardmost edge having an inwardly offset portion for clamping between the front fender and the front fender portion of the skeletal body, said offset portion extending longitudinal rearward beyond the edge of the front fender to form a gap for allowing longitudinal movement therebetween, said rear portion of said panel having a rearmost edge formed inwardly to comprise a portion of the wheel opening of the rear fender, sealing means mounted between said rearmost edge and the rear fender portion of the skeletal body, and synthetic clips connecting said front portion of said panel to the door sill portion of the skeletal body and said rearmost edge of said panel to the rear fender portion of the skeletal body.

* * * * *